(12) United States Patent
Kinpara et al.

(10) Patent No.: US 7,144,214 B2
(45) Date of Patent: Dec. 5, 2006

(54) ROTOR SUPPORTING STRUCTURE OF WINDMILL FOR POWER GENERATION

(75) Inventors: Shiro Kinpara, Sizuoka (JP); Hisakazu Uchiyama, Fukuroi (JP)

(73) Assignee: Sunpower Co., Ltd. (JP)

( * ) Notice: Subject to any disclaimer, the term of this patent is extended or adjusted under 35 U.S.C. 154(b) by 111 days.

(21) Appl. No.: 10/503,666

(22) PCT Filed: Feb. 8, 2002

(86) PCT No.: PCT/JP02/01115

§ 371 (c)(1),
(2), (4) Date: Aug. 6, 2004

(87) PCT Pub. No.: WO03/067079

PCT Pub. Date: Aug. 14, 2003

(65) Prior Publication Data

US 2005/0244271 A1    Nov. 3, 2005

(51) Int. Cl.
*F03D 3/02* (2006.01)
(52) U.S. Cl. .................. 415/4.4; 415/142; 415/907; 415/60; 416/120; 416/198 R; 416/211; 416/244 R
(58) Field of Classification Search ............. 415/4.2, 415/4.4, 142, 60, 907; 416/120, 198 R, 211, 416/244 R, 146 R; 290/44, 55
See application file for complete search history.

(56) References Cited

U.S. PATENT DOCUMENTS 4,247,253 A * 1/1981 Seki et al. ............... 416/44
4,255,085 A * 3/1981 Evans ................... 416/197 A
4,926,061 A * 5/1990 Arreola, Jr. ............... 290/55

FOREIGN PATENT DOCUMENTS

| EP | 1 096 144 A2 | 5/2001 |
| JP | 62-008388 Y2 | 2/1987 |
| JP | 62-197672 A1 | 9/1987 |

OTHER PUBLICATIONS

International Search Report for PCT/JP02/01115 mailed on Apr. 23, 2002.

* cited by examiner

*Primary Examiner*—Ninh H. Nguyen
(74) *Attorney, Agent, or Firm*—Rader, Fishman & Grauer PLLC (57) ABSTRACT

A windmill 10 includes a frame 11 and a rotor 12 provided rotatively around the vertical shaft center. The rotor includes bosses 23, 24 located above and below, plural transversal blades 25 extending radially from the bosses, longitudinal blades 26 held by the front edges of the transversal blades 25 of both above and below bosses. The frame includes bearing 19, 20 supporting the bosses 23, 24 of the rotor rotatively around the vertical shaft center, spokes 17 provided radially supporting the bearing, and legs 15 holding the spoke 17 away from the ground. In the lower bearing 20, a generator connected to the boss 24 of the rotor 12 is accommodated.

12 Claims, 8 Drawing Sheets

ROTOR SUPPORTING STRUCTURE OF WINDMILL FOR POWER GENERATION

FIELD OF THE INVENTION

This invention relates to a windmill for wind power generation, and more particularly to a large windmill having large power generation capacity.

BACKGROUND ARTS

As a windmill for wind power generation, such a type of windmill is known that it has a horizontal rotation axis rotatively on the top of a supporting post, and the front edge of the rotation axis is provided with plural blades of a propeller shape. The other type of windmill is also known that it has a vertical rotation axis provided with plural longitudinal blades of a radial shape. These types of windmill have high power generation efficiency when they are jumboized because they receive a larger wind force.

However, merely jomboizing makes it difficult to support its own weight, and the own weight increases rotational resistance causing difficulties in practical application. Accordingly, conventional windmills have a limit of the power generation capacity up to 3000 kw. This invention is directed to provide a windmill less affected by the own weight and having high stability of rotation even in jumboized windmills.

DISCLOSURE OF INVENTION

The windmill for wind power generation of this invention comprises a rotor assembly having bosses located above and below, a support extending radially from each boss, and a longitudinal blade supported by a front edge of the support of both above and below bosses; and a frame assembly having a roller bearing retaining the boss of the rotor assembly rotatively around a vertical shaft center and a leg holding the roller bearing at a position away from a ground.

In such a windmill, the support is preferable to be a transversal blade, which yields a lift force in the rotative direction when the longitudinal blade is forced by a wind. Further the frame assembly is preferable to be provided with a lock means to keep the longitudinal blade in a restrained condition at a position adjacent to a zone in which the longitudinal blade rotates. Furthermore the frame assembly is preferable to be provided with a ring placed horizontally at a position adjacent to a zone in which the longitudinal blade rotates, and the rotor assembly is provided with a wheel running along the ring. Additionally, the frame assembly and the rotor assembly are preferable to be provided with a pair of repelling magnet in which the combination of the both magnet braces the rotor assembly upward.

The windmill of this invention, each longitudinal blade is mounted through the intermediary of the support, the longitudinal blade is located away from the rotation axis yielding a large torque. Further, since the longitudinal blade and the boss are jointed by plural supports, the winds cause few effects against the parts of the windmill except for the longitudinal blades. Further, its weight is light allowing easy jumboizing and enlarging of the power generation capacity.

In the case that the support is so composed as to yield a lift force in the direction of rotation when the longitudinal blades rotate in a wind, the rotating transversal blades mounted on the bosses so as to rotate horizontally yield a lift force bracing the rotor upward, which reduces the load of the roller bearing retaining the rotor assembly and reduces the rolling resistance. Accordingly, the high rotation efficiency and the large generated power can be easily obtained. In the case that the lift force exceeds the rotor assembly weight, the rotor assembly floats and further enhances the rotation efficiency.

In the case that the frame assembly is provided with a lock means to keep the longitudinal blade in a restrained condition at the position adjacent to the zone in which the longitudinal blades rotate, the longitudinal blades can be fixed by the lock means preventing the windmill or generator from failure due to hard rotation in a strong wind. Further, the direct fixing of the longitudinal blades prevents a large force to be applied to the support.

In the windmill of this invention, the frame assembly is provided with a ring placed horizontally at the position adjacent to the zone in which the longitudinal blades rotate, and the rotor assembly is provided with a wheel running along the ring, the load to the roller bearing supporting the rotor assembly is reduced and the rolling resistance is decreased. Accordingly, it has high rotation efficiency and large power generation capacity. Further, providing wheels on the longitudinal blade helps support the weight of the longitudinal blades removing loads from the radial supports.

In the case that wheels are mounted on the rotor assembly provided with the transversal blades, when the rotation speed of the rotor assembly is low the weight of the rotor assembly is supported by the wheel before it floats by the lift force yielded of the transversal blades. When the rotation speed of the rotor becomes high, it floats and the rolling resistance due to the wheel becomes zero. Therefore, the multiplier action of the transversal blades and the wheel achieves the stable rotation and efficient rotation together.

Additionally, the frame assembly and the rotor assembly are provided with a pairs of compelling magnets in such a combination as to brace the rotor assembly upward, the magnets generate an upward bracing force without any contact to each other enabling to endure the high-speed rotation and the large weight load with the low resistance.

BEST MODE FOR CARRYING OUT THE INVENTION

Figure 1:
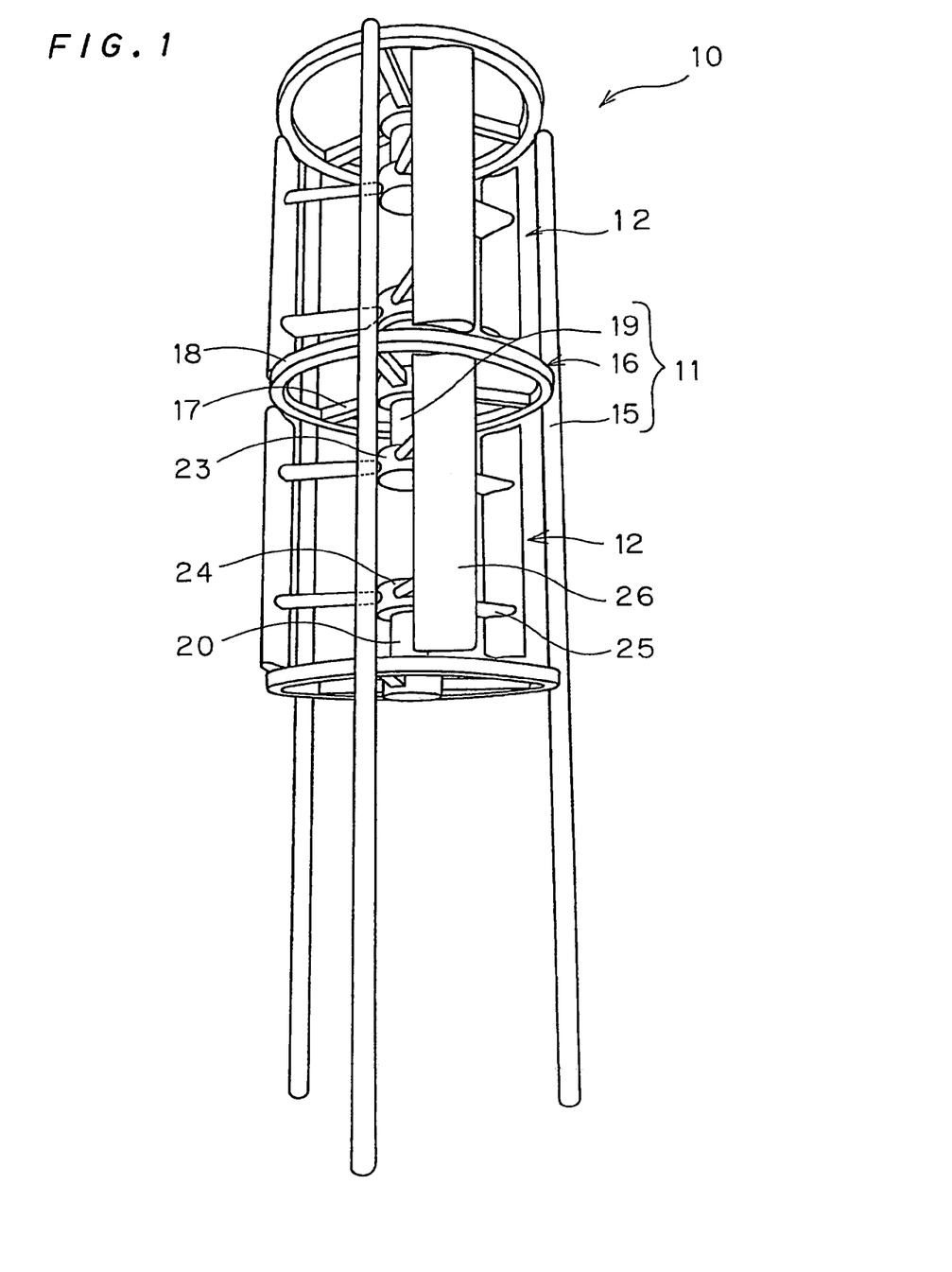
FIG. 1 is a perspective view of an embodiment of the windmill of this invention.

The windmill 10 shown in FIG. 1 is composed of the frame 11 and the rotors 12 located on the upper stage and the lower stage in the frame. The each rotor 12 is, as shown in FIG. 2, provided rotatively around the vertical axis 13 of the frame 11.

Figure 2:
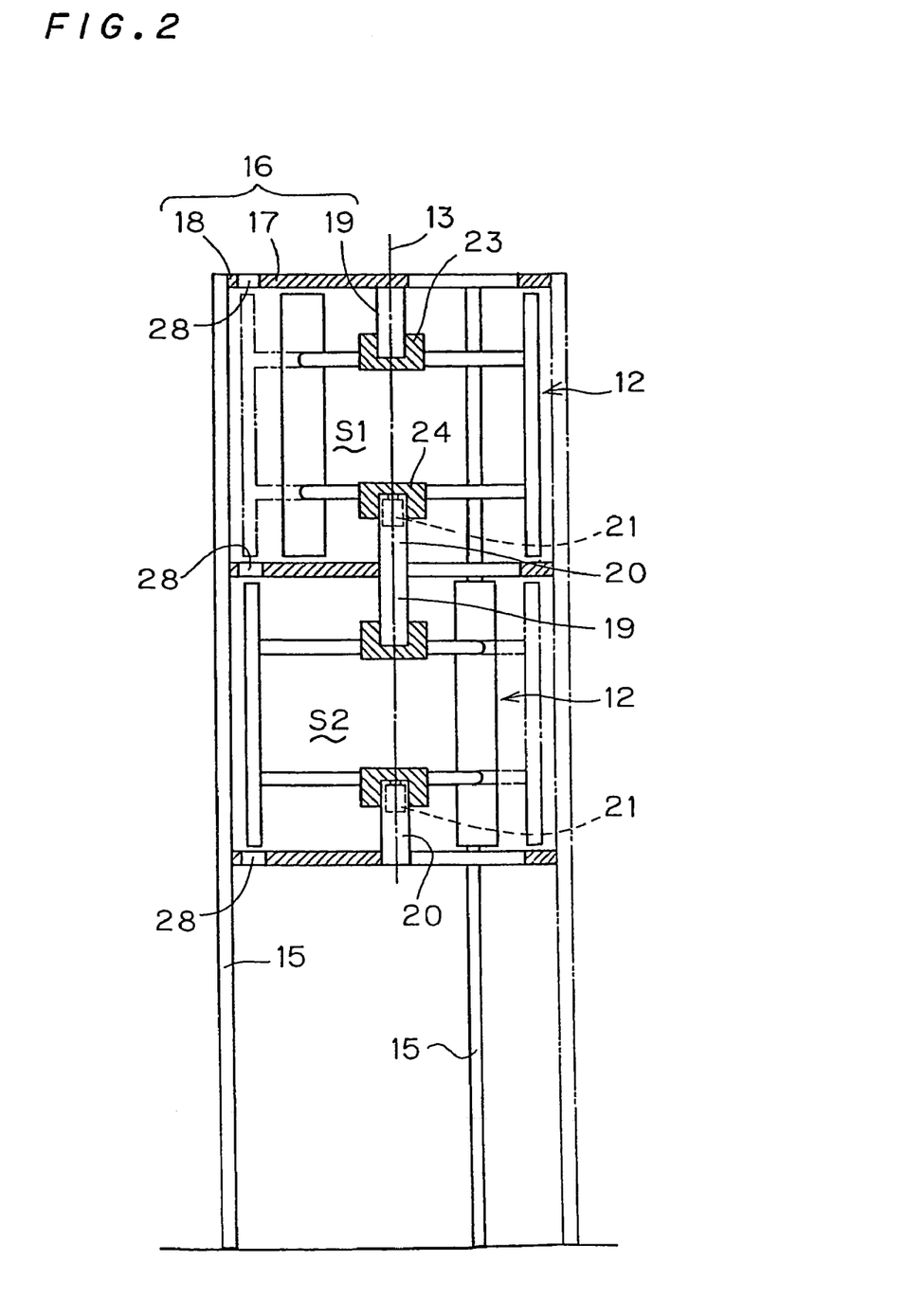
FIG. 2 is a longitudinal section of the windmill.
Figure 3:
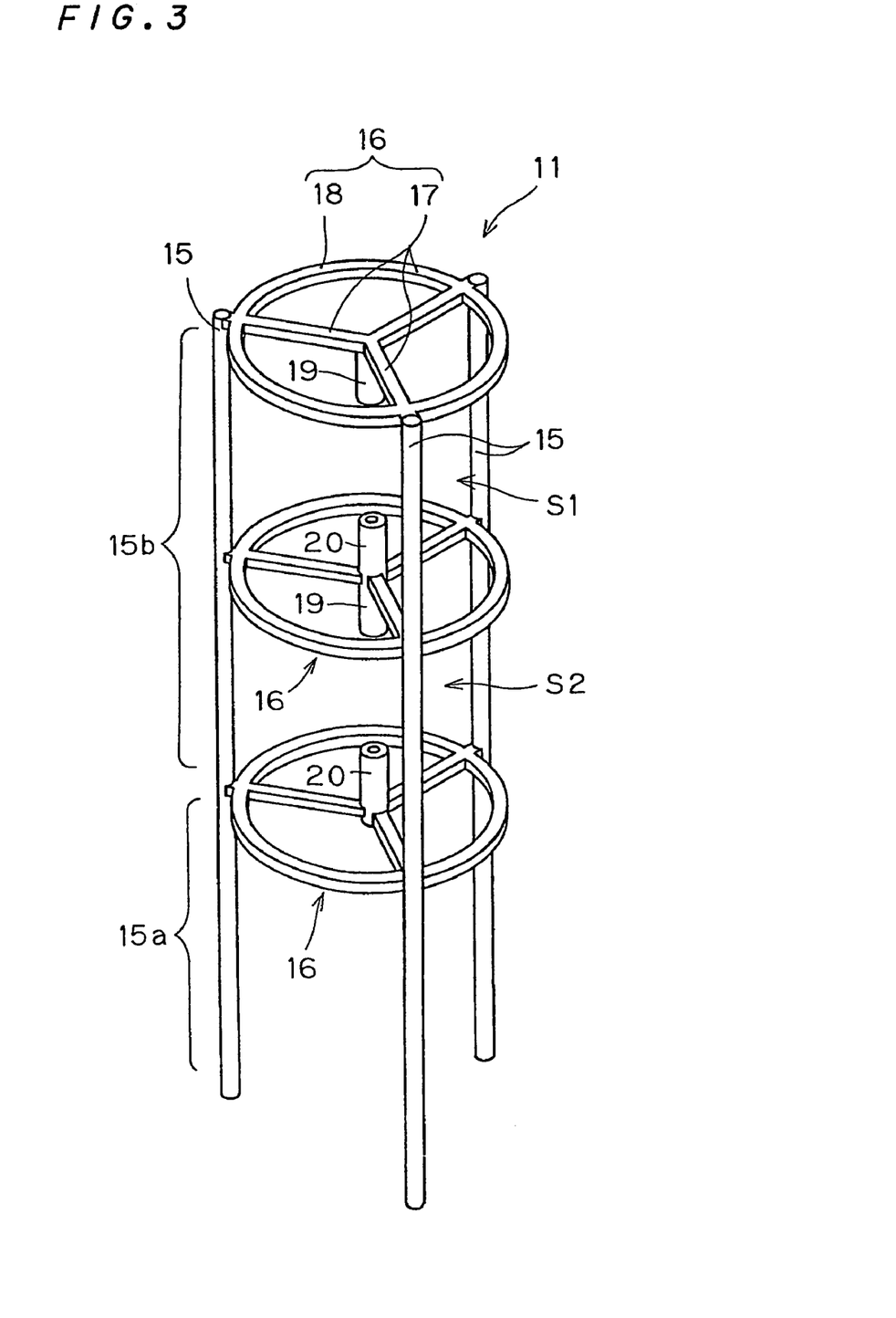
FIG. 3 is a plain view of the windmill.

The frame 11 comprises three vertical legs 15 and joint part 16 connecting these legs in an equal interval circumferentially, as shown in FIG. 3. The joint parts 16 are located in three stages, at the top of the leg 15, at the position upper than the lower end to some extent, and at the medium position of them. In the space S1, S2 between each joint part 16, the rotors 12 are accommodated (See FIG. 2). The joint part 16 comprises three spoke 17 extending radially and the ring 18 to connect the outer edge of the spoke 17 to each other. On the center of the spoke 17 of the upper joint part 16, the cylindrical bearing 19 for supporting the rotor rotatively is mounted downward. Further, on the joint part 16 the bearing 20 is mounted upward. Furthermore, on the medium joint part 16, both of the upward and downward bearings 19 and the upward bearing 20 are mounted.

As shown in FIG. 2, a generator 21 is provided inside of the bearing 20. In a jumbo windmill, a spiral stair or an elevator is provided inside of the legs 15, and inside of the spoke 17 is formed as a connecting corridor. There is no restriction for the size of the frame, and for example the size of the diameter of the ring 18 from several meters to several dozen meters or longer may be employed. As the height of the legs 15, the size ranging from several meters to several dozen meters may be employed.

Figure 4:
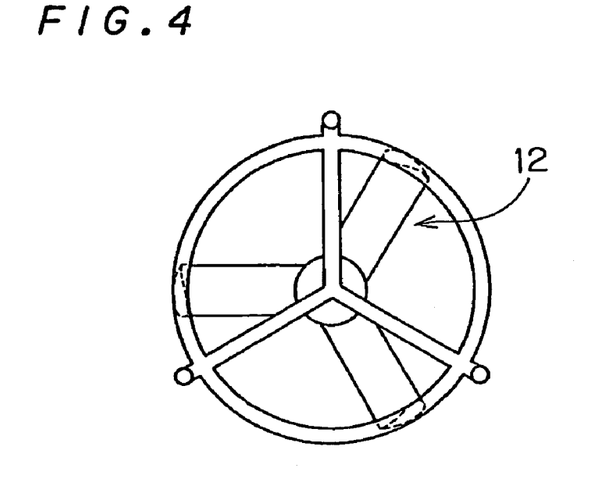
FIG. 4 is a perspective view of the rotor assembly used in the windmill.
Figure 5:
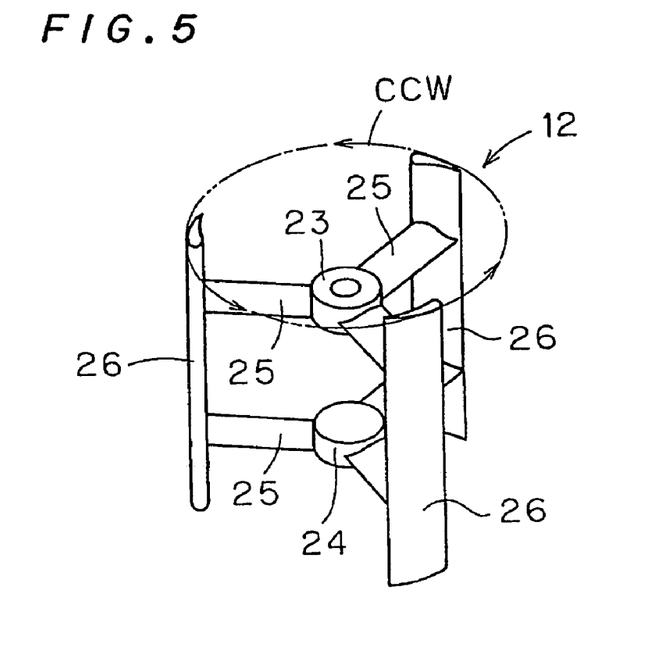
FIG. 5 is a rough perspective view of the frame assembly used in the windmill.

As shown in FIG. 4 and FIG. 5, the rotor 12 comprises a pair of the upper and the lower bosses 23, 24, the three transversal (horizontal) blades 25 extending radially from each boss, and the longitudinal (vertical) blades 26 fixed on the front edges of the upper and the lower transversal blades 25. In this embodiment, three longitudinal blades 26 and doubled six transversal blades are provided. The transversal blade 25 has, in this embodiment, a cross section of the wing so as to yield an upward lift force when the bosses 23, 24 rotate counterclockwise viewed from top. The front edge of the wing can be inclined upward in the rotative direction. The inclination of the wing can be combined with the wing shape. Further, the inclination can be made adjustable. In the case that the direction of the longitudinal blade is reverse and the rotor rotates in reverse direction, the direction of the transversal blade 25 is reversed to yield a lift force in clockwise rotation.

The longitudinal blade 26 has a wing shape which yields a counterclockwise moment indicated by the arrow formed by a resultant force yielded in the three longitudinal blades 26 by a lateral wind. The longitudinal blade 26 can also be inclined around the vertical shaft center, and the wing shape and the inclination can also be combined. Further, the inclination can be made adjustable. The longitudinal blade 26 can be mounted to be adjustable in angle so as to be capable of reverse rotation of the rotor 12 depending on the wind direction.

As shown in FIG. 2, the rotor 12 is mounted each in the upper space Si and in the lower space S2 of the frame 11. The upper boss 23 of the rotor 12 is fitted to the periphery of the downward bearing 19 rotatively, and the lower boss 24 is fitted to the periphery of the upward bearing 20 rotatively. The upper and the lower bosses can be connected, and this case is included in this invention. However, the connection between the bosses is preferable to be omitted for weight saving. In the mounted condition the weight of the rotor 12 is supported by the upward bearing 20 as shown in FIG. 2. In this embodiment, the bearings 19, 20 have the shape of shaft and the bosses are fitted to the periphery of the bearing, but inversely the bosses can have a protruding shafts whose periphery are covered by the bearing 19, 20. The rotation axis of the generator 21 in the bearing 20 is connected to the lower boss 24 of the rotor 12.

In the windmill 10, the hydraulic power unit 28 is provided in the ring 18 of the frame 11 or in the spoke 17 as a means to lock the rotation of the rotor 12. The hydraulic power unit 28 comprises, for example, a hydraulic cylinder, a pad or a head provided on the rod of the cylinder, and a guide for the head. The hydraulic power unit 28 having a rod extending downward is provided in the upper spoke 17, and the hydraulic power unit 28 having a rod extending upward is provided in the medium spoke 17. Such opposed arrangement of vertical one pair as described above is preferable. The hydraulic power unit 28 is preferable to be provided with respect to each longitudinal blade 26 so as to restrain the upper and the lower end of the three longitudinal blades 26. It is the same with the lower stage rotor. Therefore, the hydraulic power unit 28 having the upward extending hydraulic cylinder and the downward extending hydraulic cylinder are used for the middle stage spoke 17.

The windmill 10 composed as above is located, for example, on the slightly higher place such as mountains or plateaus or along coastlines same as conventional windmill for wind power generation, so as to catch much wind. When a wind blows, the longitudinal blades 26 catch the wind to rotate the rotors 12 counter clockwise as shown in FIG. 3. Since the transversal blades 25 yield a lift force, the load of the lower bearing 20 supporting the weight of the rotor 12 becomes lower and decreases rotational resistance. Thereby allowing efficient rotation of the rotor 12 under a weak wind. By the rotation of the rotor 12, the generator 21 generates electric power, and the power is transmitted to consuming regions or to the batteries for storage. In the case that the distribution area of the power is far away and the generator is an alternating current generator, the voltage is changed by an electrical transformer before the power transmission. In the case of direct current generator, the power is converted into alternative currents before the power transmission In such case as winds of typhoon of which wind power is extremely large, the longitudinal blades 26 are hold at the position corresponding to the hydraulic power unit 28, and the upper and the lower edge of the longitudinal blade 26 are restrained by being tucked into the hydraulic power units 28 to lock the rotor stably. The restraint of the longitudinal blades 26 prevents the transversal blade 25 from a large bending force to be applied. In the case of a small windmill, such a lock as to restrain the rotation between the boss 23, 24 and the bearing 19, 29 can be provided. Further, in place of the hydraulic power unit, an air unit or an electric motor driven lock can be employed.

In the embodiment described above the weight of the rotor 12 is supported by the lower boss 24 and the upward bearing 20, but the weight can be distributed to other portions. For example, in the windmill shown in the FIG. 6, the wheel 31 rolling on the ring 18 is provided on the lower edge of the longitudinal blade 26. Further in this embodiment, the wheel 32 rolling along the under side of the ring 18 is also provided on the upper edge of the longitudinal blade 26. As the wheel 31, 32, pneumatic rubber tires can be used, but the rubber wheels without air is preferable. The each wheel 31, 32 are preferable to be accommodated most of their bodies in the longitudinal blade 26 in order to reduce an air resistance.

Figure 6:
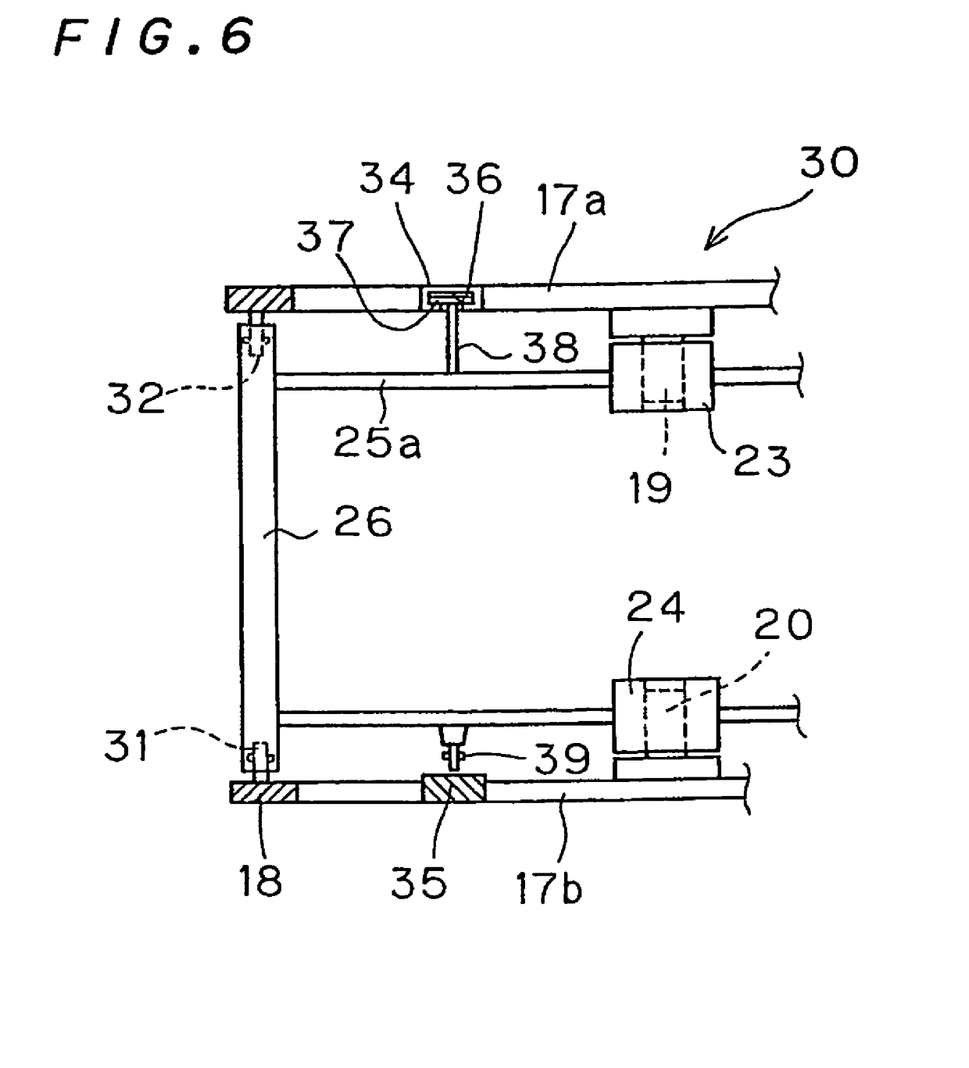
FIG. 6 is a major cross section of another embodiment of the windmill of this invention.

In this embodiment, the lower edge wheel 31 can support the weight of the rotor 12, particularly the weight of the longitudinal blade 26, thereby reducing the load of the transversal blade 25 and the bearing 20. Further, it also reduces the friction resistance of the bearing 20 allowing efficient rotation. Further, when the rotor is hit by an upward gust of wind, the contact of the upper edge wheel 32 of the longitudinal blade 26 to the under side of the ring 18 prevents the transversal blade 25 from a large bending force. When the rotor 12 rotates, the wheels 31, 32 roll along the ring 18 against only the rotative resistance leaving least obstruction for the rotor 12 to rotate.

The wheel 31, 32 are preferable to be composed as follows; in an usual condition, a gap is provided between the ring 18 and the wheel, and when the support (transversal blade 25) no longer able to hold the weight of the transversal blade 25 and the longitudinal blades 26 due to the striking of the resistance or the wind to the windmill, the wheels contact the ring 18 for the first time. In this case, since there is no rolling resistance in the usual condition and the wheels contact the ring 18 when the deflection of the support (transversal blades 25) exceed a constant volume, and further deflection can be prevented.

In the case that the wheels 31 of the lower edge only are provided and the rotor 12 is somewhat movably mounted in vertical direction, or in the case that the transversal blade 25 and supports are flexible; when the rotor 12 rotates slow, the weight of the rotor 12 is supported by the wheels because the transversal blade 25 can not yield enough lift force. When the rotor 12 rotates fast and yield enough lift force, the rotor floats from the ring 18 and keeps the wheels 31 away from the upper surface of the ring 18. Thus, the rolling resistance of the wheels decreases according to the rise of the lift force and the efficiency of the rotation increases. The wheels 31 support the weight of the rotor 12, when the lift force decreases due to the slow down of the rotation in weak wind. This action appears to be similar to that of airplane wheels.

The longitudinal blades 26 and the transversal blades 25 are preferable to be as light as possible even if the rigidity becomes weak and the blades become flexible. Lightening the blades decreases the load of supports such as the bearing 19, 20 etc. and in the case that the blades have flexibility, blades can be supported by the wheels etc. as described above. Further, in the shut down period, the lock means can protect the blades. Therefore, the similar material suitable for the wing of gliders is used for the longitudinal blades 26 and transversal blades 25.

In the windmill 30 shown in FIG. 6, small diameter rings 34, 35 are provided concentrically with the bearing 19, 20 on the upper spoke 17a and the lower spoke 17c of the rotor 12. In the upper small diameter ring 34 a suspended rail 36 is provided and the runner 37 running in the suspended rail and the upper transversal blade 25a are connected by a hanging rod 38. A wheel 39 rolling on the lower small diameter ring 35 is provided on the lower transversal blade 25b. Accordingly, the weight of the rotor 12, the wind force applied on the longitudinal blades 26 and the transversal blades 25 are dispersedly transferred to the frame preventing the transversal blades 25 from large bending stress, and the load of the bearing 20 is also small.

Figure 7:
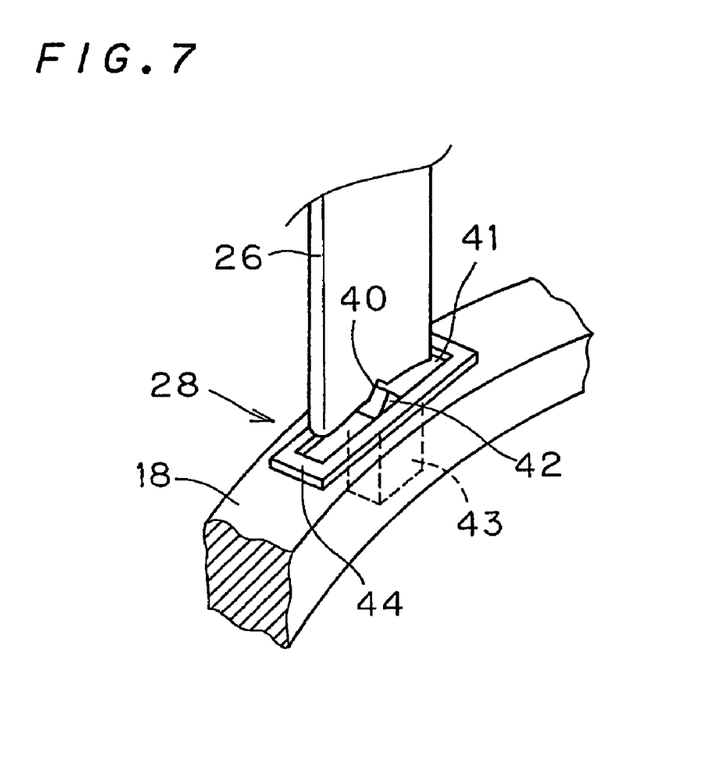
FIG. 7 and FIG. 8 are a major perspective view of the other embodiment of the windmill of this invention.

In the longitudinal blade 26 shown in FIG. 7, a cut 40 is formed at its edge. On the other hand, a projection 42 fitted to the cut 40 is provided on the vertically movable head 41 of the hydraulic power unit 28 in the ring 28. As the cut 40, V notch or U notch is used. The reference numeral 43 is the hydraulic cylinder accommodated in the ring 18, and the reference numeral 44 is a guide which guides the vertical movement of the head 41.

In this embodiment, when the head 41 is been moved upward by operating the hydraulic cylinder 43, after the pose of the transversal blade 26, the projection 42 fits to the cut 40 of the longitudinal blade 26. Thus, the movement of the longitudinal blade 26 is restrained more securely with small power than that of the case fixing by the friction torque. In place of the cut 40 and the projection 42, front and rear shoulders which engage with the periphery of the edge of the longitudinal blade 26 can be provided on the head side. In other words, provision of an engaging means to restrain the movement of the longitudinal blade 26 between the lock means and the longitudinal blade 26 can make sure the restraint of the rotor.

The engaging means such as the cut 40 and the projection 42 or shoulders like shown in FIG. 7, may be added to the locking means restraining the top of the longitudinal blades 26. Thus, the longitudinal blades 26 can be restrained by pinching top and bottom.

Figure 8:
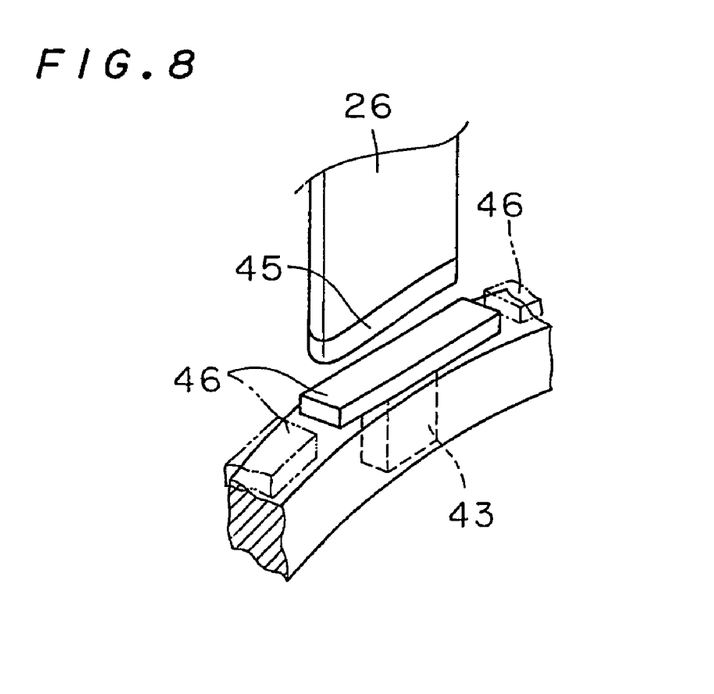

The longitudinal blade 26 shown in FIG. 8 is provided with a magnet 45 on its lower edge, and on the opposed ring 18, a magnet 46 repelling against the magnet of the longitudinal blade 26 is provided. The ring side magnets 46 are preferable to be laid out as many as possible on the ring, but provision of plural magnets with some intervals can be also sufficient. The magnet 45, 46 are permanent magnets, but they can be eletromagnets. In the case that these repelling magnets 45, 46 are provided on the longitudinal blade 26 and the ring 18, the rotor 12 is braced upward by the repelling force and decreases the load of the transversal blade 25 and the bearing 20, thereby decreases the friction resistance and increases the efficiency of the rotation. The lower magnet 46 has the advantageous effect also when it is provided on any part of the frame such as spoke, other than ring 18.

The lower magnet 46 can be an electromagnet whose magnetic polarity is changeable and can be provided on the locking means such as the head 41 etc. of the hydraulic power unit shown in FIG. 7. In which case, the magnet polarity is made to be repelling polarity to the magnet of the longitudinal blade 26 in the usual rotation, and it is changed to the attractive polarity in the halt condition. Thus, the floating action of the rotor 12 in the rotation is obtained, and in the halt condition the stopping action of the longitudinal blade 26 at the opposed position to the locking means is obtained, thereby stopping the longitudinal blade 26 quickly at the position of the locking means.

Figure 9:
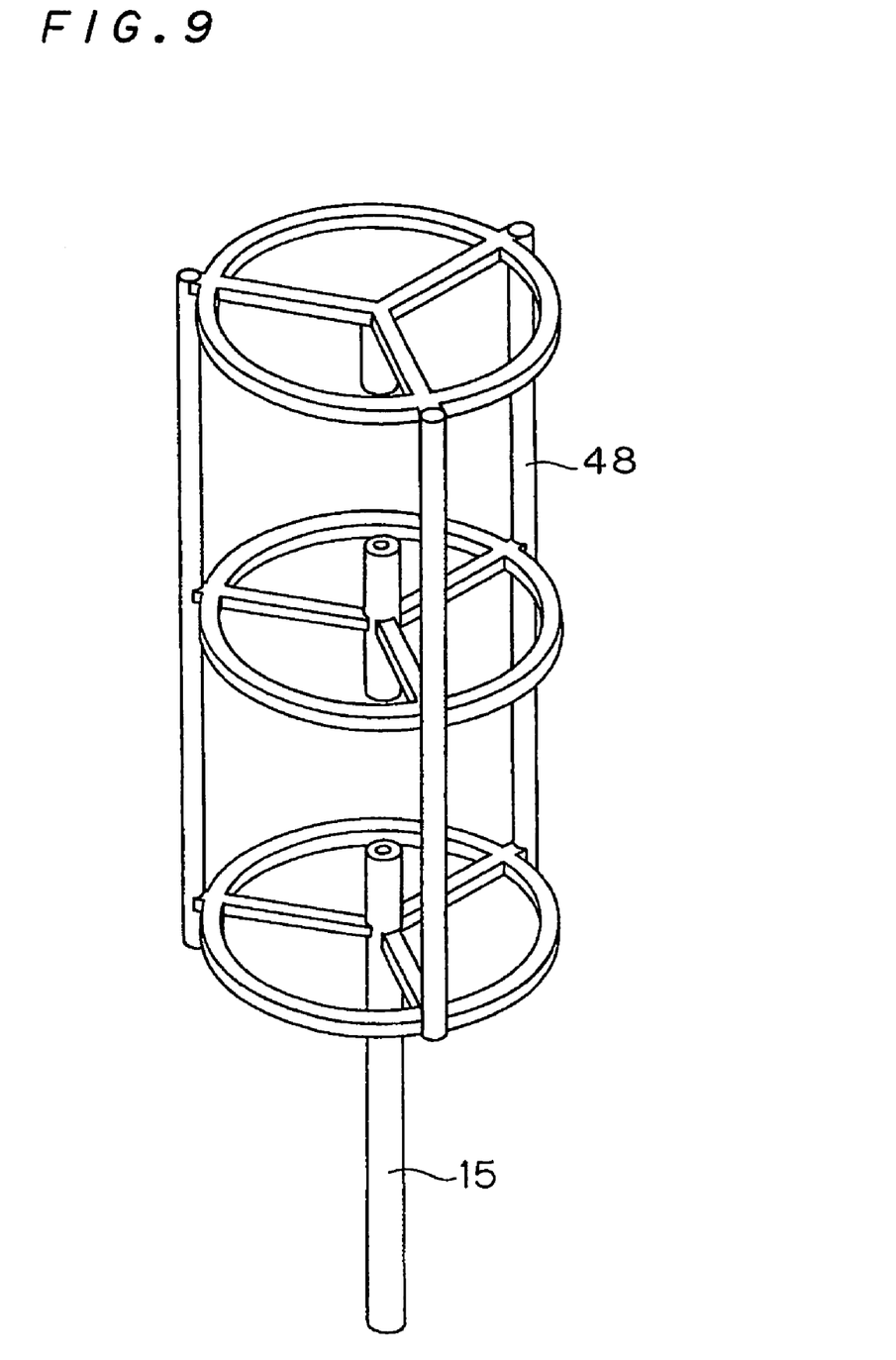
FIG. 9 is a perspective view of the other embodiment of the lock means used in this windmill of this invention.

In the embodiment described above, as shown in FIG. 3, the frame 11 has three legs 15 whose upper part 15a composes an enclosing frame holding the ring and the spokes. However, the enclosing frame and the part 15b holding the windmill are not necessary to be continuous bars but to be separate parts. In this case, for example as shown in FIG. 9, it can be separated into the three bars 48 composing the enclosing frame and the one leg 15 unified with the lowest boss. By unifying the leg 15, the required area for installation can be decreased. The leg 15 can be two-legged or more than four-legged.

In the embodiment described above, the longitudinal blades 26 and the bosses 23, 24 are connected by the transversal blades 25, but in place of these blades, supports such as simple bars etc. can be used, in which case no lift force by the transversal blade is yielded.

Figure 10:
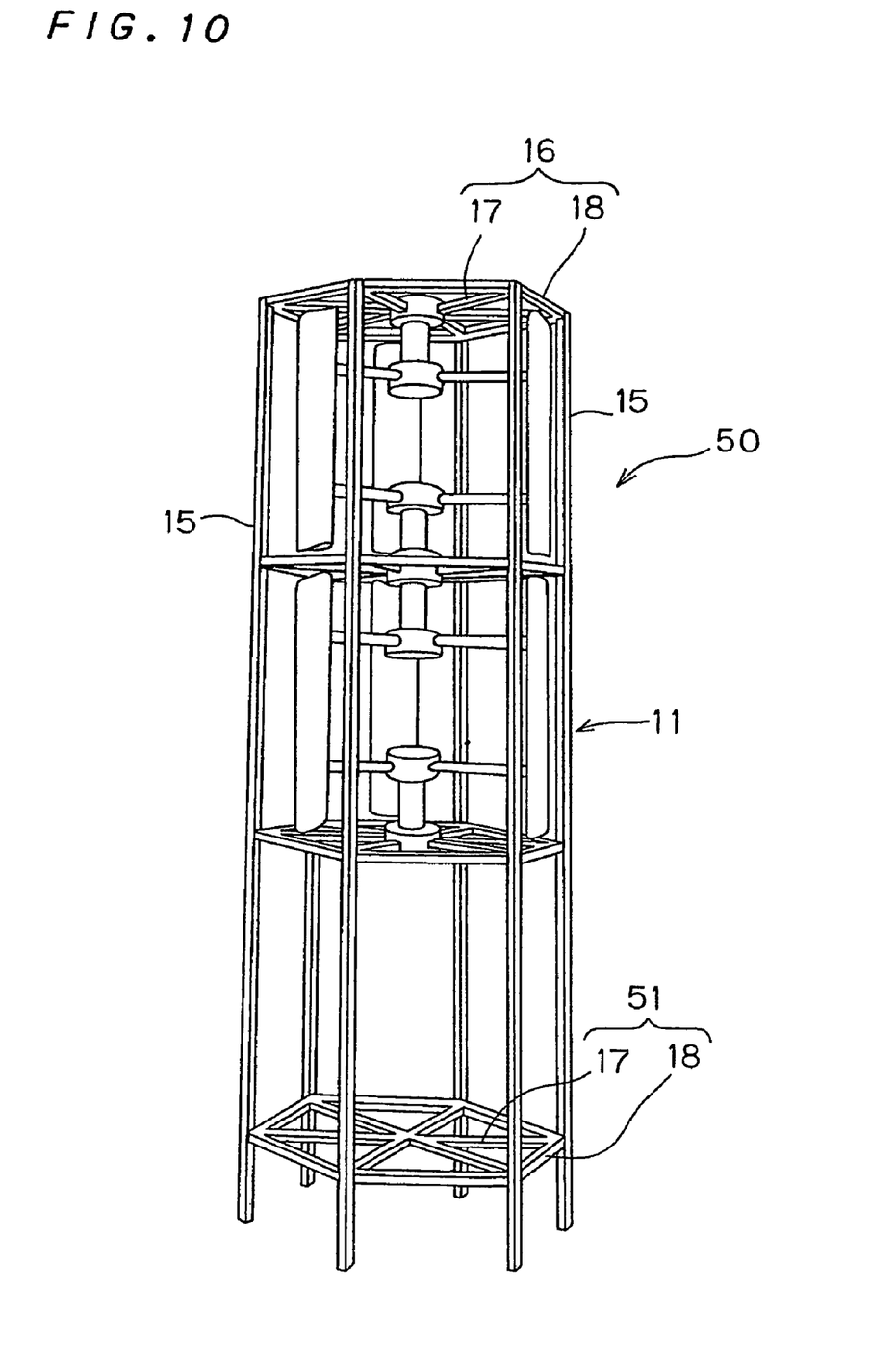
FIG. 10 is a perspective view of added another embodiment of the windmill of this invention.

FIG. 10 shows an embodiment composing the frame 11 by assembling straight structural materials. For example, not circular ring but six straight structural materials are connected to form hexagonal ring 18, and not round bar but square bar or square pipe legs 15 are used, wherein the six legs 15 are used. The ring 18 can be pentagonal or octagonal etc.

The windmill 50 shown in FIG. 10, the structure is almost same as the windmill 10 of FIG. 1 and employs the frame 11 using hexagonal ring 18. The spoke 17 is composed by assembling six pentangular bars radially. It can also be composed by crossing three square bars. Further, the legs 15 are mounted on six each top of the ring 18. And in the vicinity of lower part of the six legs 15, a connecting member 51 using the hexagonal ring 18 and the six spoke 17 is intervened for reinforcing the structure. The frame 11 of the windmill 50 can be easily constructed by building technologies of architectural structure such as conventional steel towers.

In the periphery of the frame 11 of the windmill 50 shown in FIG. 10, lattice type wire rods can be provided in parallel with the each ring 18. In this case the wire rods can protect the longitudinal blades 26 from things flying from outside and can reinforce the frame. However, since such wire rods weaken winds blowing the longitudinal blade 26, the rods are preferable to be as thin as possible. In place of the wire rods, fences can be formed using two crosswise wire rods and vertical wire rods connecting them up and down. The fences can be provided in one pair of double spiral shape.

The windmill using straight structural material, further, the windmill provided with the above lattice type or double spiral fences as shown in FIG. 10 have elegant shape, thereby being useful for sightseeing tower to be viewed or climbed.

What is claimed is:

1. A rotor supporting structure of a windmill for wind power generation, comprising;
    a rotor assembly having bosses located above and below, a support extending radially from each boss, and a longitudinal blade supported by a front edge of the support of both above and below bosses, the above boss having an upwardly-facing bearing receiving hole, the below boss having a downwardly-facing bearing receiving hole; and
    a frame assembly having a stationary downwardly pending cylindrical bearing rotatably received in the upwardly-facing bearing receiving hole and a stationary upwardly extending cylindrical bearing rotatably received in the downwardly-facing bearing receiving hole.

2. A rotor supporting structure of a windmill according to claim 1, wherein
    the support is a transversal blade which yields a lift force in the rotative direction when the vertical blade is forced by a wind.

3. A rotor supporting structure of a windmill according to claim 1, wherein
    the frame assembly is provided with a lock means to keep the longitudinal blade in a restrained condition at a position adjacent to a zone in which the longitudinal blade rotates.

4. A rotor supporting structure of a windmill according to claim 1, wherein
    the frame assembly and the rotor assembly are provided with a pair of repelling magnets in which the combination of the both magnets braces the rotor assembly upward.

5. A rotor supporting structure of a windmill for wind power generation, comprising:
    a rotor assembly having bosses located above and below, a support extending radially from each boss, and a longitudinal blade supported by a front edge of the support of both above and below bosses; and
    a frame assembly having a roller bearing retaining the boss of the rotor assembly rotatively around a vertical shaft center and a leg holding the roller bearing at a position away from a ground, wherein
    the frame assembly is provided with a ring placed horizontally at a position adjacent to a zone in which the vertical blade rotates, and the rotor assembly is provided with a wheel running along the ring.

6. A rotor supporting structure of a windmill for wind power generation, comprising:
    a rotor assembly having bosses located above and below, a support extending radially from each boss, and a longitudinal blade supported by a front edge of the support of both above and below bosses; and
    a frame assembly having a leg holding the roller bearing at a position away from a ground, and a joint part connecting the legs in an equal interval circumferentially, wherein
    the joint part comprises plural spokes connected to a roller bearing extending radially and a pair of rings located above and below connected to the legs connecting an outer edge of the spoke to each other; wherein
    a roller bearing retains the boss of the rotor assembly rotatively around a vertical shaft center and the rotor assembly is set between the above and below rings.

7. A rotor supporting structure of a windmill according to claim 6, wherein
    the ring is provided with a lock means to keep a top or bottom of the longitudinal blade in a restrained condition.

8. A rotor supporting structure of a windmill according to claim 6, wherein
    the spoke is provided with a lock means to keep the longitudinal blade in a restrained condition.

9. A rotor supporting structure of a windmill according to claim 6, wherein
    a magnet is set at a bottom of the longitudinal blade and magnets which repels the magnet set at a bottom of the longitudinal blade, are set at the bottom ring.

10. A rotor supporting structure of a windmill according to claim 6, wherein
    the frame comprises three rings and the rotor assembly having a generator is arranged into two stages, upper and lower.

11. A rotor supporting structure of a windmill according to claim 6, wherein
    a wheel is arranged at a bottom of the rotor assembly running along the below ring.

12. A rotor supporting structure of a windmill for wind power generation, comprising;
    a rotor assembly having bosses located above and below, a transversal blade extending radially from each boss, and a longitudinal blade having supported by a front edge of the transversal blade of both above and below bosses; and
    a frame assembly having a roller bearing retaining the boss of the rotor assembly rotatively around a vertical shaft center and a leg holding the roller bearing at a position away from a ground, wherein
    the longitudinal blade has a wing shape which yields a rotative force when forced by a lateral wind and the transversal blade has a wing shape which yields a lift force when forced by a lateral wind.

* * * * *